United States Patent
Koga

(10) Patent No.: US 11,549,078 B2
(45) Date of Patent: Jan. 10, 2023

(54) LUBRICATING OIL COMPOSITION AND IMPREGNATED BEARING

(71) Applicant: IDEMITSU KOSAN CO.,LTD., Chiyoda-ku (JP)

(72) Inventor: Asami Koga, Taito-ku (JP)

(73) Assignee: IDEMITSU KOSAN CO., LTD., Tokyo (JP)

(*) Notice: Subject to any disclaimer, the term of this patent is extended or adjusted under 35 U.S.C. 154(b) by 0 days.

(21) Appl. No.: 15/734,786

(22) PCT Filed: May 31, 2019

(86) PCT No.: PCT/JP2019/021758
§ 371 (c)(1),
(2) Date: Dec. 3, 2020

(87) PCT Pub. No.: WO2019/235382
PCT Pub. Date: Dec. 12, 2019

(65) Prior Publication Data
US 2021/0230499 A1    Jul. 29, 2021

(30) Foreign Application Priority Data

Jun. 8, 2018 (JP) .............................. JP2018-110691

(51) Int. Cl.
| | | |
|---|---|---|
| C10M 169/04 | (2006.01) | |
| C10M 105/36 | (2006.01) | |
| C10M 145/14 | (2006.01) | |
| F16C 33/10 | (2006.01) | |
| C10N 20/04 | (2006.01) | |
| C10N 30/02 | (2006.01) | |
| C10N 40/02 | (2006.01) | |

(52) U.S. Cl.
CPC ...... *C10M 169/041* (2013.01); *C10M 105/36* (2013.01); *C10M 145/14* (2013.01); *F16C 33/104* (2013.01); *F16C 33/109* (2013.01); *C10M 2207/2825* (2013.01); *C10M 2209/084* (2013.01); *C10N 2020/04* (2013.01); *C10N 2030/02* (2013.01); *C10N 2040/02* (2013.01)

(58) Field of Classification Search
CPC ............ C10M 169/041; C10M 145/14; C10M 105/36; C10M 2207/2825; C10M 2209/084; F16C 33/109; F16C 33/104; C10N 2030/02; C10N 2020/04; C10N 2040/02
See application file for complete search history.

(56) References Cited

U.S. PATENT DOCUMENTS

2007/0037715 A1    2/2007    Okada

FOREIGN PATENT DOCUMENTS

| CN | 1748092 A | | 3/2006 |
|---|---|---|---|
| CN | 102333851 A | | 1/2012 |
| CN | 104379711 A | | 2/2015 |
| CN | 106164231 A | | 11/2016 |
| CN | 106459821 A | | 2/2017 |
| JP | 2007-46009 A | | 2/2007 |
| JP | 2015-113400 A | | 6/2015 |
| JP | 2015113400 A | * | 6/2015 |
| JP | 2015-151506 A | | 8/2015 |

OTHER PUBLICATIONS

International Search Report dated Jul. 16, 2019 in PCT/JP2019/021758 filed on May 31, 2019, citing documents AA and AO-AP therein, 1 page.
Extended European Search Report dated Jan. 19, 2022, in EPC Application No. 19814672.2—6 pages.
Office Action dated Feb. 15, 2022, in JP Application No. 2018-110691, w/English translation—7 pages.
Combined Chinese Office Action and Search Report dated Apr. 24, 2022 in Patent Application No. 201980037377.5 (with English language translation and English translation of Category of Cited Documents), citing documents AO-AT therein, 17 pages.
Office Action dated Nov. 9, 2022, in EPC Application No. 19814672.2—4 pages.

* cited by examiner

*Primary Examiner* — Taiwo Oladapo
(74) *Attorney, Agent, or Firm* — Oblon, McClelland, Maier & Neustadt, L.L.P.

(57) ABSTRACT

Provided are a lubricating oil composition which contains a base oil (A) containing an ester-based oil (A1), and a polymer (B) having a constituent unit (b) derived from an alkyl (meth)acrylate, wherein the content of the polymer (B) is 0.1 to 10% by mass based on the total amount of the lubricating oil composition, the lubricating oil composition has a viscosity index of 350 or more, the lubricating oil composition has a BF viscosity at −40° C. of 4000mPa·s or less, and the lubricating oil composition is used for an impregnated bearing, and an impregnated bearing impregnated with the lubricating oil composition. The lubricating oil composition has excellent lubricity in use in a wide temperature environment from a low temperature region to a high temperature region, is capable of maintaining excellent infiltration property even in an environment in which a temperature change between a low temperature and a high temperature is severe, and is suitable for use in an impregnated bearing.

8 Claims, No Drawings

LUBRICATING OIL COMPOSITION AND IMPREGNATED BEARING

TECHNICAL FIELD

The present invention relates to a lubricating oil composition and an impregnated bearing impregnated with the lubricating oil composition.

BACKGROUND ART

In recent years, an impregnated bearing formed by sintering metal powder has been widely used as a bearing to be incorporated in equipment such as automotive electrical equipment, household electrical equipment, and OA office equipment.

In general, an impregnated bearing is a sliding bearing that is manufactured by forming a metal powder as a raw material into a porous metal body through steps such as mixing, forming, sintering, and sizing, and then vacuum-impregnating the metal body with a lubricating oil using an impregnation apparatus, and is used in a self-lubricating state.

In the impregnated bearing, the lubricating oil impregnated in the porous metal body is supplied to the sliding surface between the rotary shaft and the inner surface of the bearing by the pumping action caused by the rotation of the rotary shaft to lubricate the sliding surface. Therefore, the impregnated bearing has advantages of excellent durability and rigidity and low production cost.

The lubricating oil with which the impregnated bearing is impregnated is required to have good properties such as viscosity characteristics, long-term stability, resistance to volatilization, and material compatibility, depending on the type of equipment including the impregnated bearing.

For example, PTL 1 describes a lubricating oil composition for impregnated bearings, which contains, as a base oil, an ester composed of a dibasic acid having a predetermined number of carbon atoms and a primary alcohol, and a predetermined amount of an alkyl (meth)acrylate polymer having an SP value of 9.2 or more and a mass average molecular weight of 100,000 to 1,000,000, and which is adjusted to have a kinematic viscosity at 100° C. of 9.3 to 11.5 $mm^2/s$.

CITATION LIST

Patent Literature

PTL 1: JP 2007-46009 A

SUMMARY OF INVENTION

Technical Problem

Meanwhile, in recent years, electric motors are often mounted on automobiles, and impregnated bearings are increasingly used as bearings for electric motors.

An electric motor for an automobile is required to be driven even in a low temperature environment of about −40° C. in cold districts such as North Europe and North America. The lubricating oil composition used in such a low temperature environment has a problem of deterioration in low temperature fluidity due to an increase in viscosity.

On the other hand, since the temperature in the engine room is high when the engine is driven, the lubricating oil composition is required to have excellent lubricity even in a high temperature environment.

The lubricating oil composition used in the impregnated bearing is also required to have excellent infiltration property so that the lubricating oil composition can be stably supplied from the pores of the porous metal body constituting the bearing. When the infiltration property of the lubricating oil composition is deteriorated, problems such as an increase in the occurrence frequency of squeal may occur.

Meanwhile, according to the study of the present inventor, it was found that a lubricating oil composition for an impregnated bearing used in an environment in which a temperature difference between a low temperature and a high temperature is large and a temperature change is severe has a low infiltration property, and it is difficult to stably supply the lubricating oil composition from pores of the metal body in some cases, and the occurrence frequency of squeal is increased.

Therefore, there is a need for a lubricating oil composition for an impregnated bearing that can maintain excellent infiltration property even in an environment in which a temperature change between a low temperature and a high temperature is severe.

In PTL 1, the above-described infiltration property is not studied.

An object of the present invention is to provide a lubricating oil composition which has excellent lubricity in use in a wide temperature environment from a low temperature region to a high temperature region, can maintain excellent infiltration property even in an environment in which a temperature change between a low temperature and a high temperature is severe, and can be suitably used for an impregnated bearing, and an impregnated bearing impregnated with the lubricating oil composition.

Solution to Problem

The present inventor has found that a lubricating oil composition containing a predetermined amount of a polymer having a constituent unit derived from an alkyl (meth) acrylate together with a base oil containing an ester-based oil, and having a viscosity index of 350 or more and a BF viscosity (Brookfield viscosity) at −40° C. of 4000 mPa·s or less can solve the above problems.

That is, the present invention provides the following to [1] to [11].

[1] A lubricating oil composition containing: a base oil (A) containing an ester-based oil (A1); and a polymer (B) having a constituent unit (b) derived from an alkyl (meth) acrylate, wherein the content of the polymer (B) is 0.1 to 10.0% by mass based on the total amount of the lubricating oil composition, the lubricating oil composition has a viscosity index of 350 or more, the lubricating oil composition has a BF viscosity at −40° C. of 4000mPa·s or less, and the lubricating oil composition is used for an impregnated bearing.

[2] The lubricating oil composition according to [1], wherein the polymer (B) has a weight average molecular weight (Mw) of 350,000 or more.

[3] The lubricating oil composition according to [1] or [2], wherein the polymer (B) has a molecular weight distribution (Mw/Mn) (Mw: weight average molecular weight of the polymer (B), Mn: number average molecular weight of the polymer (B)) of 2.2 or less.

[4] The lubricating oil composition according to any one of [1] to [3], wherein the polymer (B) has a constituent unit (b1) derived from methyl (meth)acrylate, and the content of the constituent unit (31) is 70 to 99 mol % based on the total amount (100 mol %) of the constituent units of the polymer (B).

[5] The lubricating oil composition according to any one of [1] to [4], wherein the polymer (B) has a constituent unit (b2) derived from an alkyl (meth)acrylate having a branched alkyl group having 25 or more carbon atoms.

[6] The lubricating oil composition according to [5], wherein the content of the constituent unit (b2) is 0.1 to 30 mol % based on the total amount (100 mol %) of the constituent units of the polymer (B).

[7] The lubricating oil composition according to any one of [1] to [6], wherein the base oil (A) contains a dibasic acid ester (A11).

[8] The lubricating oil composition according to any one of [1] to [7], wherein the content of a mineral oil in the base oil (A) is less than 5% by mass based on the total amount of the base oil (A).

[9] The lubricating oil composition according to any one of [1] to [8], wherein the lubricating oil composition has a pour point of −40° C. or lower.

[10] The lubricating oil composition according to any one of [1] to [9], wherein the lubricating oil composition has a kinematic viscosity at 100° C. of 10.0 to 15.0 mm$^2$/s.

[11] An impregnated bearing impregnated with the lubricating oil composition according to any one of [1] to [10].

Advantageous Effects of Invention

The lubricating oil composition of the present invention has excellent lubricity in use in a wide temperature environment from a low temperature region to a high temperature region, and can maintain excellent infiltration property even in an environment in which a temperature change between a low temperature and a high temperature is severe, and thus can be suitably used for an impregnated bearing.

DESCRIPTION OF EMBODIMENTS

In the description herein, the kinematic viscosity and the viscosity index mean values measured or calculated in accordance with JIS K2283:2000.

In the description herein, the weight average molecular weight (Mw) and the number average molecular weight (Mn) are values calculated as standard polystyrene measured by a gel permeation chromatography (GPC) method, and specifically mean values measured by the methods described in Examples.

In the description herein, for example, "alkyl (meth)acrylate" is used as a term indicating both "alkyl acrylate" and "alkyl methacrylate", and the same applies to other similar terms and similar notations.

[Lubricating oil composition]

A lubricating oil composition of the present invention is a lubricating oil composition containing a base oil (A) containing an ester-based oil (A1) and a polymer (B) having a constituent unit (b) derived from an alkyl (meth)acrylate.

The lubricating oil composition of the present invention is prepared so as to satisfy the following requirements (I) and (II) so that it can be suitably used for an impregnated bearing.

Requirement (I): The viscosity index of the lubricating oil composition is 350 or more.

Requirement (II): The lubricating oil composition has a BF viscosity at −40° C. of 4000 mPa·s or less.

In the description herein, the BF viscosity means a value measured in accordance with ASTM D2983. [0013]

In general, the lubricating oil composition has been subjected to high viscosity indexing from the viewpoint of obtaining a lubricating oil composition suitable for use in a wide temperature environment. However, even in a general high-viscosity indexed lubricating oil composition, the viscosity index thereof is usually about 300, and from the above viewpoint, the viscosity index is sufficient.

However, as described above, in the lubricating oil composition for an impregnated bearing used in an environment in which the temperature difference between a low temperature and a high temperature is large and the temperature change is severe, even when the viscosity index is increased to about 300, the infiltration property is insufficient, and it is difficult to stably supply the lubricating oil composition from the pores of the metal body in some cases, and it is found that the occurrence frequency of squeal is increased.

With respect to such a problem, the lubricating oil composition of the present invention is adjusted to have a viscosity index of 350 or more as defined in the requirement (I), so that the temperature dependence of the viscosity is very small. Therefore, even in an environment in which a temperature change between a low temperature and a high temperature is severe, a change in viscosity is small, and thus good infiltration property can be maintained. As a result, when the lubricating oil composition of the present invention is used in an impregnated bearing, the occurrence frequency of squeal can be effectively reduced.

In addition, the lubricating oil composition of the present invention has a viscosity index adjusted to 350 or more, and thus can exhibit good lubricity when used in a wide temperature environment from a low temperature region to a high temperature region.

The viscosity index of the lubricating oil composition of the present invention is, as defined in the requirement (I), 350 or more, and from the above viewpoint, preferably 370 or more, more preferably 380 or more, still more preferably 390 or more, and even more preferably 400 or more.

In addition, the requirement (II) is a definition that focuses on the fluidity of the lubricating oil composition in a low temperature environment at about −40° C. assuming the use in a cold district.

In a low temperature environment of about −40° C., the viscosity of the lubricating oil composition is increased, which causes a problem of deterioration of fluidity, and at the same time, the infiltration property in a low temperature environment is deteriorated, which may cause problems such as an increase in the occurrence frequency of squeal.

With respect to such a problem, the lubricating oil composition of the present invention can have good infiltration property in a low temperature environment of about −40° C. when used for an impregnated bearing, by adjusting the BF viscosity at −40° C. to 4000 mPa·s or less as defined in the requirement (II).

The BF viscosity at −40° C. of the lubricating oil composition of the present invention is 4000 mPa·s or less as defined in the requirement (II), but from the above viewpoint, it is preferably 3800 mPa·s or less, more preferably 3600 mPa·s or less, still more preferably 3500 mPa·s or less, and even more preferably 3400 mPa·s or less, and usually 1000 mPa·s or more.

In order to obtain a lubricating oil composition satisfying only the requirement (I), the content of the polymer (B) may be increased. However, the lubricating oil composition obtained in this way has a very high probability of not satisfying the above requirement (II). That is, the addition of a large amount of the polymer (B) tends to cause an increase in BF viscosity due to the presence of the polymer (B) in a low temperature environment of about −40° C.

Further, depending on the compatibility between the base oil (A) and the polymer (B), it may be difficult to prepare a lubricating oil composition satisfying the requirements (I) and (II). That is, in order to improve the infiltration property of the lubricating oil composition in a low temperature environment and an environment in which a temperature change between a low temperature and a high temperature is severe, it is necessary to prepare the lubricating oil composition so as to satisfy the requirements (I) and (II) in consideration of the compatibility between the base oil (A) and the polymer (B).

The lubricating oil composition of the present invention satisfies the requirements (I) and (II) by considering at least the following matters.

The polymer (B) has a constituent unit (b) derived from an alkyl (meth)acrylate.

The content of the polymer (B) is adjusted to 0.1 to 10.0% by mass based on the total amount of the lubricating oil composition.

In addition to the above matters, a lubricating oil composition satisfying the above requirements (I) and (II) can be obtained by appropriately considering the type of the ester-based oil (A), the type of the alkyl (meth)acrylate of the constituent unit (b) of the polymer (B), the content ratio of the constituent unit of the polymer (B), the molecular weight of the polymer (B), and the like.

Specific preparation methods are as described in the section of components (A) and (B) described later.

The pour point of the lubricating oil composition according to one aspect of the present invention is preferably −40° C. or lower, more preferably −45° C. or lower, and still more preferably −50° C. or lower, from the viewpoint of obtaining a lubricating oil composition capable of exhibiting more excellent lubricity and infiltration property when used in a low temperature environment.

In the description herein, the pour point means a value measured in accordance with JIS K2269:1987.

In addition, the kinematic viscosity at 100° C. of the lubricating oil composition according to one aspect of the present invention is preferably 10.0 to 15.0 mm$^2$/s, more preferably 10.5 to 14.5 mm$^2$/s, still more preferably 11.0 to 14.0 mm$^2$/s, and even more preferably 11.6 to 13.5 mm$^2$/s, from the viewpoint of obtaining a lubricating oil composition capable of exhibiting more excellent lubricity in a high temperature environment such as in an engine room when an automobile engine is driven.

The lubricating oil composition of the present invention contains the components (A) and (B), and may further contain an additive for lubricating oil other than the component (B) as long as the effects of the present invention are not impaired.

In the lubricating oil composition according to one aspect of the present invention, the total content of the components (A) and (B) is preferably 70 to 100% by mass, more preferably 80 to 100% by mass, still more preferably 85 to 100% by mass, and even more preferably 90 to 100% by mass, based on the total amount (100% by mass) of the lubricating oil composition.

Hereinafter, each component that can be contained in the lubricating oil composition according to one aspect of the present invention will be described in detail.

<Base oil (A)>

The lubricating oil composition according to one aspect of the present invention contains a base oil (A) containing an ester-based oil (A1).

By containing the ester-based oil (A1) as the base oil (A), the compatibility with the polymer (B) is improved, and the lubricating oil composition having the above requirements (I) and (II) is easily prepared.

From the above viewpoint, the content of the ester-based oil (A1) in the base oil (A) used in one aspect of the present invention is preferably 60 to 100% by mass, more preferably 75 to 100% by mass, still more preferably 90 to 100% by mass, and even more preferably 95 to 100% by mass, based on the total amount (100% by mass) of the base oil (A).

The kinematic viscosity at 100° C. of the base oil (A) used in one aspect of the present invention is preferably 2.0 to 5.5 mm$^2$/s, more preferably 2.5 to 5.0 mm$^2$/s, still more preferably 3.0 to 4.5 mm$^2$/s, and even more preferably 3.2 to 4.2 mm$^2$/s.

In addition, the viscosity index of the base oil (A) used in one aspect of the present invention is preferably 100 or more, more preferably 120 or more, still more preferably 140 or more, and even more preferably 160 or more.

In one aspect of the present invention, when a mixed oil obtained by combining two or more base oils is used as the base oil (A), it is preferable that the kinematic viscosity and the viscosity index of the mixed oil are within the above ranges.

In the lubricating oil composition according to one aspect of the present invention, the content of the base oil (A) is preferably 60% by mass or more, more preferably 70% by mass or more, still more preferably 80% by mass or more, and even more preferably 85% by mass or more, and preferably 99.5% by mass or less, more preferably 99.0% by mass or less, and still more preferably 97.0% by mass or less, based on the total amount (100% by mass) of the lubricating oil composition.

[Ester-based oil (A1)]

Examples of the ester-based oil (A1) include a compound having an ester bond, and examples thereof include a dibasic acid ester, a polyol ester, an aromatic ester, and a phosphoric acid ester.

The ester-based oils may be used alone or in combination of two or more kinds thereof.

Among these, as the ester-based oil (A1), a dibasic acid ester is preferable.

That is, in one aspect of the present invention, the base oil (A) preferably contains a dibasic acid ester (A11) from the viewpoint of further improving the compatibility with the polymer (B) to obtain a lubricating oil composition that satisfies the above requirements (I) and (II).

From the above viewpoint, the content of the dibasic acid ester (A11) in the base oil (A) used in one aspect of the present invention is preferably 60 to 100% by mass, more preferably 75 to 100% by mass, still more preferably 90 to 100% by mass, and even more preferably 95 to 100% by mass, based on the total amount (100% by mass) of the base oil (A).

Examples of the dibasic acid ester (A11) include esters of a dibasic acid and a primary alcohol. From the viewpoint of obtaining a lubricating oil composition that satisfies the above requirements (I) and (II), a compound represented by the following general formula (a-1) is preferable.

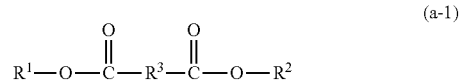

(a-1)

In the general formula (a-1), $R^1$ and $R^2$ are each independently an alkyl group having 2 to 20 carbon atoms (preferably 4 to 16 carbon atoms, more preferably 6 to 13 carbon atoms, and still more preferably 8 to 12 carbon atoms).

$R^3$ is an alkylene group having 2 to 20 carbon atoms (preferably 4 to 16 carbon atoms, more preferably 6 to 13 carbon atoms, and still more preferably 8 to 12 carbon atoms).

Examples of the alkyl group that may be selected as $R^1$ and $R^2$ include an ethyl group, a propyl group, an isopropyl group, a butyl group, an isobutyl group, a hexyl group, an octyl group, a 2-ethylhexyl group, a nonyl group, a 3,3,5-trimethylhexyl group, a decyl group, a dimethyloctyl group, an undecyl group, a dodecyl group, a tridecyl group, a tetradecyl group, and an a hexadecyl group.

The alkyl group may be a linear alkyl group or a branched alkyl group, but is preferably a branched alkyl group.

Examples of the alkylene group that may be selected as $R^3$ include an ethylene group, a propylene group, an isopropylene group, a butylene group, an isobutylene group, a pentylene group, a hexylene group, a heptylene group, an octylene group, a 2-ethylhexylene group, a nonylene group, a decylene group, an undecylene group, a tridecylene group, and a hexadecylene group.

The alkylene group may be a linear alkylene group or a branched alkylene group, but is preferably a linear alkylene group.

[Base oil other than ester-based oil (A1)]

The lubricating oil composition according to one aspect of the present invention may contain a synthetic oil other than the ester-based oil (A1) as the base oil (A) as long as the effects of the present invention are not impaired.

Examples of the synthetic oil other than the ester-based oil (A1) include poly α-olefins such as α-olefin homopolymers and α-olefin copolymers (for example, α-olefin copolymers having 8 to 14 carbon atoms such as ethylene-α-olefin copolymers); isoparaffins; various esters such as polyalkylene glycol and polyphenyl ether; alkylbenzenes; and alkylnaphthalenes.

These synthetic oils may be used alone or in combination of two or more kinds thereof.

The lubricating oil composition according to one aspect of the present invention may contain a mineral oil as the base oil (A) as long as the effects of the present invention are not impaired, but from the viewpoint of improving the solubility with the polymer (B), the content of the mineral oil is preferably as small as possible.

From the above viewpoint, the content of the mineral oil in the base oil (A) is preferably less than 5% by mass, more preferably less than 2% by mass, still more preferably less than 1% by mass, even more preferably less than 0.01% by mass, and particularly preferably 0% by mass, based on the total amount (100% by mass) of the base oil (A).

Examples of the mineral oil as used herein include an atmospheric residue obtained by atmospheric distillation of a crude oil such as a paraffin-based crude oil, an intermediate-based crude oil, and a naphthene-based crude oil; a distillate obtained by subjecting such an atmospheric residue to distillation under reduced pressure; and a mineral oil obtained by subjecting the distillate to one or more purification treatments such as solvent deasphalting, solvent extraction, hydrocracking, solvent dewaxing, catalytic dewaxing, and hydrorefining.

Further, a base oil (GTL) or the like obtained by isomerizing a wax (GTL wax (Gas To Liquids WAX)) produced from natural gas by a Fischer-Tropsch process or the like is also preferably used.

<Polymer (B)>

The lubricating oil composition of the present invention contains a polymer (B) having a constituent unit (b) derived from an alkyl (meth)acrylate. The polymer (B) plays a role as a viscosity index improver.

In the lubricating oil composition of the present invention, the content of the polymer (B) is required to be 0.1 to 10.0% by mass based on the total amount (100% by mass) of the lubricating oil composition.

When the content of the polymer (B) is less than 0.1% by mass, it is difficult to obtain a lubricating oil composition having a high viscosity index that satisfies the requirement (I). In particular, deterioration of lubricity tends to be a problem when used in a high temperature environment.

On the other hand, when the content of the polymer (B) is more than 10.0% by mass, a lubricating oil composition satisfying the requirement (I) is easily obtained, but it is difficult to prepare a lubricating oil composition satisfying the requirement (II). That is, in a low temperature environment of about −40° C., the BF viscosity tends to increase due to the presence of a large amount of the polymer (B).

In the lubricating oil composition according to one aspect of the present invention, the content of the polymer (B) is preferably 0.5% by mass or more, more preferably 1.0% by mass or more, still more preferably 1.6% by mass or more, and even more preferably 2.0% by mass or more from the viewpoint of preparing a lubricating oil composition satisfying the requirement (I), and preferably 8.5% by mass or less, more preferably 7.0% by mass or less, still more preferably 6.0% by mass or less, and even more preferably 5.0% by mass or less from the viewpoint of preparing a lubricating oil composition satisfying the requirement (II), based on the total amount (100% by mass) of the lubricating oil composition.

In consideration of handling property and solubility with the base oil (A), the polymer (B) is often commercially available in the form of a solution dissolved in a diluent oil.

In the description herein, the "content of the polymer (B)" is a content in terms of a resin component constituting the polymer (B) excluding the mass of the diluent oil in the solution diluted with the diluent oil.

The weight average molecular weight (Mw) of the polymer (B) is preferably 350,000 or more, more preferably 400,000 or more, still more preferably 450,000 or more, and even more preferably 480,000 or more from the viewpoint of preparing a lubricating oil composition satisfying the requirement (I) while limiting the content of the polymer (B), and is preferably 1,000,000 or less, more preferably 800,000 or less, still more preferably 700,000 or less, and even more preferably 650,000 or less from the viewpoint of preparing a lubricating oil composition satisfying the requirement (II).

The molecular weight distribution (Mw/Mn) of the polymer (B) (Mw: weight average molecular weight of the polymer (B), Mn: number average molecular weight of the polymer (B)) is preferably 2.2 or less, more preferably 2.1 or less, still more preferably 2.0 or less, and even more preferably 1.9 or less.

The smaller the molecular weight distribution of the polymer (B), the better the solubility of the polymer (B) with the base oil (A), and the more easily the aggregation of the polymer (B) is suppressed in a low temperature environment. Therefore, when the molecular weight distribution of the polymer (B) is 2.2 or less, it is easy to prepare a lubricating oil composition satisfying the requirements (I) and (II).

The lower limit of the molecular weight distribution (Mw/Mn) of the polymer (B) is not particularly limited, but is usually 1.05 or more, preferably 1.10 or more, and more preferably 1.15 or more.

The polymer (B) contained in the lubricating oil composition of the present invention has a constituent unit (b) derived from an alkyl (meth)acrylate, but may have a constituent unit derived from a monomer other than an alkyl (meth)acrylate as long as the effects of the present invention are not impaired.

However, in the polymer (B) used in one aspect of the present invention, the content of the constituent unit (b) is preferably 70 to 100 mol %, more preferably 80 to 100 mol %, still more preferably 90 to 100 mol %, and even more preferably 95 to 100 mol %, based on the total amount (100 mol %) of the constituent units of the polymer (B).

In one aspect of the present invention, the polymer (B) is preferably a polymer having a constituent unit (b1) derived from methyl (meth)acrylate, from the viewpoint of preparing a lubricating oil composition satisfying the requirements (I) and (II).

From the above viewpoint, the content of the constituent unit (b1) is preferably 70 to 99 mol %, more preferably 75 to 97 mol %, still more preferably 80 to 95 mol %, and even more preferably 85 to 93 mol %, based on the total amount (100 mol %) of the constituent units of the polymer (B).

In one aspect of the present invention, from the viewpoint of preparing a lubricating oil composition satisfying the requirements (I) and (II), the polymer (B) is preferably a polymer having a constituent unit (b2) derived from an alkyl (meth)acrylate having a branched alkyl group having 25 or more carbon atoms (preferably 25 to 35 carbon atoms, and more preferably 28 to 32 carbon atoms), and is more preferably a copolymer having both constituent units (b1) and (b2).

When the polymer (B) has a branched alkyl group, aggregation of the polymer (B) is easily suppressed in a low temperature environment, and this can also contribute to an increase in the viscosity index of the lubricating oil composition. When the number of carbon atoms of the branched alkyl group is 25 or more, a lubricating oil composition having a high viscosity index is easily obtained even when the content of the polymer (B) is relatively small, and thus a lubricating oil composition satisfying the requirements (I) and (II) is easily prepared.

From the above viewpoint, the content of the constituent unit (b2) is preferably 0.1 to 30 mol %, more preferably 1 to 25 mol %, still more preferably 3 to 20 mol %, and even more preferably 5 to 17 mol %, based on the total amount (100 mol %) of the constituent units of the polymer (B).

From the above viewpoint, the total content of the constituent units (b1) and (b2) is preferably 70 to 100 mol %, more preferably 80 to 100 mol %, still more preferably 90 to 100 mol %, and even more preferably 95 to 100 mol %, based on the total amount (100 mol %) of the constituent units of the polymer (B).

<Additive for Lubricating Oil>

The lubricating oil composition according to one aspect of the present invention may further contain an additive for lubricating oil other than the component (B) as needed as long as the effects of the present invention are not impaired.

Examples of the additive for lubricating oil include an antioxidant, a metal-based detergent, a dispersant, a friction modifier, an anti-wear agent, an extreme pressure agent, a pour point depressant, an anti-foaming agent, a rust inhibitor, a metal deactivator, and an antistatic agent.

In addition, a compound having a plurality of functions as the above-described additive (for example, a compound having functions as an anti-wear agent and an extreme pressure agent) may be used.

Further, each of the additives for lubricating oil may be used alone or in combination of two or more kinds thereof.

The content of each of these additives for lubricating oil can be appropriately adjusted within a range that does not impair the effects of the present invention, and is usually 0.001 to 15% by mass, preferably 0.005 to 10% by mass, and more preferably 0.01 to 5% by mass, independently for each additive, based on the total amount (100% by mass) of the lubricating oil composition.

The lubricating oil composition according to one aspect of the present invention may contain a viscosity index improver other than the component (B), but from the viewpoint of preparing a lubricating oil composition satisfying the requirements (I) and (II), the content of the viscosity index improver other than the component (B) is preferably as small as possible.

Specifically, the content of the viscosity index improver other than the component (B) is preferably 0 to 10 parts by mass, more preferably 0 to 5 parts by mass, still more preferably 0 to 1 part by mass, and even more preferably 0 to 0.1 parts by mass with respect to 100 parts by mass of the total amount of the component (B).

[Use of Lubricating Oil Composition]

The lubricating oil composition of the present invention has excellent lubricity in use in a wide temperature environment from a low temperature region to a high temperature region, and can maintain excellent infiltration property even in an environment in which a temperature change between a low temperature and a high temperature is severe.

Therefore, the lubricating oil composition of the present invention can be suitably used for an impregnated bearing incorporated in equipment such as automotive electrical equipment, household electrical equipment, and OA office equipment, and can be suitably used for an impregnated bearing incorporated in an electric motor mounted on an automobile.

In particular, the lubricating oil composition of the present invention is more preferably used for an impregnated bearing that is used in a low temperature environment of about −40° C., such as in cold districts such as North Europe and North America, and that is used in an environment in which the temperature difference between a low temperature and a high temperature is large and the temperature change is severe.

In view of the above-mentioned properties of the lubricating oil composition of the present invention, the present invention may also provide the following [1] and [2].

[1] An impregnated bearing impregnated with the lubricating oil composition of the present invention.

[2] Use of a lubricating oil composition using the above-described lubricating oil composition of the present invention as a lubricating oil for an impregnated bearing.

EXAMPLES

Next, the present invention will be described in more detail with reference to examples, but the present invention is not limited to these examples. Methods for measuring or evaluating various physical properties are as follows.

(1) Kinematic Viscosity, Viscosity Index

The kinematic viscosity and the viscosity index were measured and calculated in accordance with JIS K2283: 2000.

(2) Weight Average Molecular Weight (Mw), Number Average Molecular Weight (Mn)

The measurement was performed under the following conditions using a gel permeation chromatograph ("Model 1260 HPLC" manufactured by Agilent Technologies), and the value measured in terms of standard polystyrene was used.

(Measurement Conditions)

Column: Two of "Shodex LF404" are successively connected each other.

Column temperature: 35° C.

Developing solvent: chloroform

Flow rate: 0.3 mL/min (3) BF Viscosity

The BF viscosity was measured in accordance with ASTM D2983.

(4) Pour Point

The pour point was measured in accordance with JIS K2269:1987.

Examples 1 and 2, Comparative Examples 1 to 4

A base oil, a polymer, and various additives were added in the types and amounts shown in Table 1 to prepare each of lubricating oil compositions. In addition, in the description of Table 1, the blending amounts of the polymer and various additives are blending amounts in terms of the active ingredient excluding the diluent oil (in terms of the resin component).

Details of the base oil, polymers, and various additives used in the preparation of the lubricating oil compositions are as follows.

<Base Oil>

Dibasic acid ester: dodecanedioic acid di(2-ethylhexyl) ester, a compound represented by the general formula (a-1) in which $R^1$ and $R^2$ are a 2-ethylhexyl group and $R^3$ is a decylene group (—$(CH_2)_{10}$—). Kinematic viscosity at 40° C.=13.9 $mm^2/s$, kinematic viscosity at 100° C.=3.71 $mm^2/s$, and viscosity index=163.

<Polymer>

PMA (1): A polymer obtained by polymerizing methyl acrylate and alkyl acrylate having a branched alkyl group having 28 to 32 carbon atoms at a content ratio of 88/12 (mol %). Mw=590,000, Mw/Mn=1.9.

PMA (2): A polymer obtained by polymerizing methyl acrylate and alkyl acrylate having a branched alkyl group having 28 to 32 carbon atoms at a content ratio of 90/10 (mol %). Mw=490,000, Mw/Mn=1.8.

PMA (3): A polymer obtained by polymerizing methyl acrylate and alkyl acrylate having a linear alkyl group having 12 to 18 carbon atoms at a content ratio of 72/28 (mol %). Mw=310,000, Mw/Mn=2.4.

PMA (4): A polymer obtained by polymerizing methyl acrylate, alkyl acrylate having a linear alkyl group having 16 carbon atoms, and alkyl acrylate having a branched alkyl group having 24 carbon atoms at a content ratio of 67/22/11 (mol %). Mw=510,000, Mw/Mn=3.2.

PMA (5): A polymer obtained by polymerizing methyl acrylate and alkyl acrylate having a linear alkyl group having 14 to 16 carbon atoms at a content ratio of 48/52 (mol %). Mw=400,000, Mw/Mn=2.4.

PMA (6): A polymer obtained by polymerizing methyl acrylate and alkyl acrylate having a branched alkyl group having 24 carbon atoms at a content ratio of 87/13 (mol %). Mw=420,000, Mw/Mn=2.3.

<Various Additives>

Antioxidant (1): Amine-based antioxidant

Antioxidant (2): Phenol-based antioxidant

Dispersant: Polybutenyl succinimide

Extreme pressure agent: Sulfur/phosphorus-based extreme pressure agent

Metal deactivator: Benzotriazole

The kinematic viscosities at 40° C. and 100° C., the viscosity index, the BF viscosity at −40° C., and the pour point of the prepared lubricating oil compositions were measured or calculated in accordance with the above-described methods. The results are shown in Table 1.

TABLE 1

| | | | | Example 1 | Example 2 | Comparative Example 1 | Comparative Example 2 | Comparative Example 3 | Comparative Example 4 |
|---|---|---|---|---|---|---|---|---|---|
| Composition | Base oil | Dibasic acid ester | % by mass | 93.85 | 93.97 | 93.85 | 93.85 | 93.85 | 93.75 |
| | Polymer | PMA (1) | % by mass | 3.50 | — | — | — | — | — |
| | | PMA (2) | % by mass | — | 3.38 | — | — | — | — |
| | | PMA (3) | % by mass | — | — | 3.50 | — | — | — |
| | | PMA (4) | % by mass | — | — | — | 3.50 | — | — |
| | | PMA (5) | % by mass | — | — | — | — | 3.50 | — |
| | | PMA (6) | % by mass | — | — | — | — | — | 3.60 |
| | Various additives | Antioxidant (1) | % by mass | 0.50 | 0.50 | 0.50 | 0.50 | 0.50 | 0.50 |
| | | Antioxidant (2) | % by mass | 0.50 | 0.50 | 0.50 | 0.50 | 0.50 | 0.50 |
| | | Dispersant | % by mass | 0.50 | 0.50 | 0.50 | 0.50 | 0.50 | 0.50 |
| | | Extreme pressure agent | % by mass | 0.95 | 0.95 | 0.95 | 0.95 | 0.95 | 0.95 |
| | | Metal deactivator | % by mass | 0.20 | 0.20 | 0.20 | 0.20 | 0.20 | 0.20 |
| | Total | | % by mass | 100.00 | 100.00 | 100.00 | 100.00 | 100.00 | 100.00 |
| Properties | Kinematic viscosity at 40° C. | | $mm^2/s$ | 30.72 | 30.19 | 53.04 | 73.28 | 64.07 | 34.65 |
| | Kinematic viscosity at 100° C. | | $mm^2/s$ | 11.99 | 11.25 | 15.6 | 20.47 | 17.21 | 11.05 |
| | Viscosity index | | — | 408 | 390 | 310 | 303 | 288 | 331 |
| | BF viscosity at −40° C. | | mPa · s | 3390 | 3320 | 5280 | 11200 | 195000 | 3920 |
| | Pour point | | ° C. | <−50 | <−50 | <−50 | <−50 | <−50 | <−50 |

Table 1 shows that the lubricating oil compositions prepared in Examples 1 and 2 have a high viscosity index of 390 or more and a low BF viscosity at −40° C. of 3390 mPa·s or less. Therefore, it is considered that these lubricating oil compositions have excellent lubricity in use in a wide temperature environment from a low temperature region to a high temperature region, and can maintain excellent infiltration property even in an environment in which a temperature change between a low temperature and a high temperature is severe, and thus these lubricating oil compositions can be suitably used for an impregnated bearing.

On the other hand, since the lubricating oil compositions prepared in Comparative Examples 1 to 4 have a viscosity index of less than 350, it is presumed that when the lubricating oil compositions are used in an environment in which a temperature change between a low temperature and a high temperature is severe, the occurrence frequency of squeal is increased due to the deterioration of infiltration property.

In addition to the above matters, the lubricating oil compositions prepared in Comparative Examples 1 to 3 have a high BF viscosity at −40° C., and thus have problems in fluidity and infiltration property in a low temperature environment. Therefore, when these lubricating oil compositions are used in an impregnated bearing, it is presumed that the occurrence frequency of squeal is increased during use in a low temperature environment.

The invention claimed is:

1. A lubricating oil composition, comprising: a base oil comprising an ester-based oil; and a polymer,
   wherein:
   a content of the polymer is from 0.1 to 10.0% by mass based on the a total amount of
   the lubricating oil composition,
   the lubricating oil composition has a viscosity index of 350 or more,
   the lubricating oil composition has a BF viscosity at −40° C. of 4000 mPas or less, and
   the lubricating oil composition is used for an impregnated bearing,
   wherein the polymer consisting of at least one unit (b1) derived from methyl (meth)acrylate, wherein a content of the unit (b1) is from 75 to 97 mol % based on a total amount of units of the polymer, and at least one unit (b2) derived from an alkyl (meth)acrylate having a branched alkyl group having from 28 to 32 carbon atoms, wherein a content of the unit (b2) is from 3 to 25 mol % based on the total amount of units of the polymer.

2. The lubricating oil composition of claim 1, wherein the polymer has a weight average molecular weight of 350,000 or more.

3. The lubricating oil composition of claim 1, wherein the polymer has a molecular weight distribution (Mw/Mn) of 2.2 or less, wherein Mw is a weight average molecular weight of the polymer and Mn is a number average molecular weight of the polymer.

4. The lubricating oil composition of claim 1, wherein the base oil comprises a dibasic acid ester.

5. The lubricating oil composition of claim 1, wherein a content of a mineral oil in the base oil is less than 5% by mass based on a total amount of the base oil.

6. The lubricating oil composition of claim 1, which has a pour point of −40° C. or lower.

7. The lubricating oil composition of claim 1, which has a kinematic viscosity at 100° C. of from 10.0 to 15.0 mm²/s.

8. An impregnated bearing impregnated with the lubricating oil composition of claim 1.

* * * * *